United States Patent

[11] 3,617,510

| [72] | Inventor | John C. Hayes |
| --- | --- | --- |
| | | Palatine, Ill. |
| [21] | Appl. No. | 855,725 |
| [22] | Filed | Sept. 5, 1969 |
| [45] | Patented | Nov. 2, 1971 |
| [73] | Assignee | Universal Oil Products Company |
| | | Des Plaines, Ill. |
| | | Continuation-in-part of application Ser. No. 839,086, July 3, 1969. |

[54] HYDROPROCESSING WITH A GERMANIUM-RHENIUM-GROUP VIII NOBLE METAL CATALYST
11 Claims, No Drawings

| [52] | U.S. Cl. | 208/111, |
| --- | --- | --- |
| | 208/109, 208/110, 208/112, 252/439, 252/441, | |
| | 252/442, 252/449, 252/455 Z, 252/460, 252/466, | |
| | | 252/472 |
| [51] | Int. Cl. | C10g 11/02 |
| [50] | Field of Search | 252/469, |
| | 460, 455 Z; 208/111, 112, 109, 110 | |

[56] References Cited
UNITED STATES PATENTS

| 2,906,700 | 9/1959 | Stine et al. | 208/138 |
| --- | --- | --- | --- |
| 2,906,701 | 9/1959 | Stine et al. | 208/138 |
| 3,415,737 | 12/1968 | Klucksdahl | 208/139 |
| 3,410,787 | 11/1968 | Kubicek | 208/57 |
| 3,471,412 | 10/1969 | Miale et al. | 252/439 |

Primary Examiner—Delbert E. Gantz
Assistant Examiner—G. E. Schmitkons
Attorneys—James R. Hoatson, Jr. and Robert W. Erickson ABSTRACT: A process for hydrotreating (hydroprocessing) hydrocarbons and mixtures of hydrocarbons utilizing a catalytic composite of a porous carrier material, a rhenium component, a germanium component and a Group VIII noble metal component, in which process the chemical consumption of hydrogen is effected. A specific example of one such catalyst is a composite of a crystalline aluminosilicate, particularly faujasite, a rhenium component, a germanium component and a platinum component. Specific hydroprocesses are directed toward the hydrogenation of aromatic nuclei, hydrocracking, the ring-opening of cyclic hydrocarbons for producing jet fuel components, desulfurization, denitrification and hydrogenation.

HYDROPROCESSING WITH A GERMANIUM-RHENIUM-GROUP VIII NOBLE METAL CATALYST

RELATED APPLICATION

The present application is a continuation-in-part of my copending application, Ser. No. 839,086, filed July 3, 1969, all the teachings of which copending application are incorporated herein by specific reference thereto.

APPLICABILITY OF INVENTION

The present invention encompasses the use of a catalytic composite of a porous carrier material, a rhenium component, a germanium component and a Group VIII noble metal component in the hydrotreating of hydrocarbons and various mixtures of hydrocarbons. As utilized herein, the term "hydrotreating" is intended to be synonymous with the term "hydroprocessing," and involves the conversion of hydrocarbons at such operating conditions as will effect a chemical consumption of hydrogen. Processes intended to be encompassed by the term "hydroprocessing" include hydrocracking, aromatic hydrogenation, ring-opening, hydrorefining (for nitrogen removal and olefin saturation), desulfurization (often included in hydrorefining), hydrogenation, etc. As will be recognized, one common attribute of these processes, and the reactions being effected therein, is that they are hydrogen consuming, and are, therefore, exothermic in nature. In employing the term, "hydroprocessing," it is intended to allude to a hydrocarbon conversion process wherein there exists a chemical consumption of hydrogen. It is further intended to exclude those conversion processes in which the hydrogen consumption stems primarily from the saturation of light olefins, resulting from undesirable cracking of charge stock and/or product components, which in turn produces light gaseous waste material, principally methane, ethane and propane. The individual characteristics of the foregoing hydrocarbon hydroprocesses, including preferred operating conditions and processing techniques, will be hereinafter described in greater detail.

The present invention involves the use of a catalytic composite having exceptional activity and resistance to deactivation in a hydrogen-consuming hydroprocess. The use of a particular dual-function catalytic composite enables substantial improvements in those hydroprocesses that have traditionally used a dual-function catalyst. The catalytic composite comprises a porous carrier material, a rhenium component, a germanium component and a Group VIII noble metal component; in a specific illustration, an improved hydrocracking process is afforded through the use of a crystalline aluminosilicate carrier material, a rhenium component, a germanium component and a platinum or palladium component, with the improvement being noted in activity, desired product selectivity and operational stability characteristics. Dual-function catalytic composites are used to promote a wide variety of hydrocarbon conversion reactions including hydrocracking, isomerization, dehydrogenation, hydrogenation, desulfurization, ring-opening, catalytic reforming, cyclization, aromatization, alkylation, polymerization, cracking, etc., some of which reactions are hydrogen producing, while others are hydrogen consuming. It is to the latter group of reactions, hydrogen consuming, that the present invention is primarily applicable. In many instances, the commercial application of these catalysts resides in processes where more than one of the reactions proceed simultaneously. An example of this type of process is a hydrocracking process wherein dual-function catalysts are utilized to effect selective hydrogenation and cracking of high molecular weight materials to produce lower boiling, more valuable product streams. Another such example would be the conversion of aromatic hydrocarbons into jet fuel components, principally straight, or slightly branched-chain paraffins.

Regardless of the reaction involved, or the particular process, it is important for the catalyst to exhibit the capability (1) to perform its specified functions initially, and (2) to perform them satisfactorily for a prolonged period of time. The analytical terms employed in petroleum refining art to measure how efficient a particular catalyst performs its intended functions, in a given hydrocarbon conversion process to produce the particular desired results, are activity, selectivity and stability. With respect to a hydrogen-consuming hydrocracking process, "activity" generally connotes the quantity of charge stock, boiling above a given temperature, which is converted to hydrocarbons boiling below the given temperature. "Selectivity" refers to the quantity of converted charge stock which boils below the desired end point of the product, as well as above a minimum specified initial boiling point. "Stability" connotes the rate of change of activity and stability. Thus, for example, where a gas oil boiling above about 650° F., is subjected to hydrocracking, "activity" alludes to the degree of conversion into 650° F.-minus product. "Selectivity" can, for example, allude to the degree of conversion into gasoline boiling range hydrocarbons—i.e. pentanes and heavier, normally liquid hydrocarbons boiling up to about 400° F.—or into kerosene boiling range hydrocarbons. "Stability" might be conveniently expressed in terms of temperature increase required during various increments of catalyst life, generally expressed as barrels of feed stock per pound of catalyst, in order to maintain the desired activity and selectivity.

It is well known to those skilled in the art, and generally conceded, that the principal cause of deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the operating conditions are such that the formation of high molecular weight, black, solid or semisolid, hydrogen-poor carbonaceous material is effected. This coats the surface of the catalyst and reduces its activity by shielding the active sites from the reactants. It is axiomatic that the performance characteristics of dual-function catalysts are very sensitive to the presence of carbonaceous deposits on the surface thereof. Accordingly, a major problem facing workers in the area of catalysis, is the development of more active and selective catalytic composites which are not as sensitive to the presence of these carbonaceous materials and/or have the capability to suppress the rate of formation thereof at the operating conditions employed in a particular process utilizing a particular type of feed stock.

One who is cognizant of petroleum refining processes and techniques, will recognize that a dual-function catalyst having superior characteristics of activity, selectivity and stability contains a Group VIII noble metal component. This type of catalyst has been widely used in processes such as hydroisomerization, dehydrogenation, dehydrocyclization, hydrocracking, catalytic reforming, and the like. This catalyst has achieved a dominant position in the art despite the fact that its principal ingredient, a noble metal, is extremely expensive, in relatively short supply and has demonstrated a history of ever-increasing cost. The economic picture, with respect to Group VIII noble metal-containing catalysts, has served as a powerful incentive for continuous, far reaching investigations directed at finding acceptable catalytic composites having improved processing characteristics, particularly respecting activity, selectivity and stability. One such catalytic composite, prominently described in the literature, results from the addition of a rhenium component to the noble metal component. Significantly, extensive investigations have indicated that a catalyst of rhenium alone possesses a degree of activity and stability which is considerably less than the conventional noble metal catalyst. As a result of my investigations, I have found a dual-function catalyst which affords added improvement over the rhenium-noble metal catalyst.

In particular, I have found that the use of catalytic composites of a germanium component, a rhenium component and a Group VIII noble metal component, with a porous carrier material improves the overall operation of these hydrogen-consuming processes. Moreover, I have determined that a catalytic composite of a crystalline aluminosilicate carrier material, a germanium component, a rhenium component and a platinum or palladium component, when utilized in a process for hydrocracking hydrocarbonaceous material into lower boiling hydrocarbon products, affords substantial improvement in performance and results. As indicated, the present invention essentially involves the use of a catalyst in which a germanium component has been added to a rhenium-noble metal, dual-function conversion catalyst whereby the performance characteristics of the process are sharply and materially improved.

OBJECTS AND EMBODIMENTS

An object of the present invention is to afford a process for hydrotreating a hydrocarbon, or mixtures of hydrocarbons. A corollary objective is to improve the stability of hydrocarbon hydroprocesses utilizing a highly active, germanium component-containing catalytic composite.

A specific object of my invention resides in the improvement of hydrogen-consuming processes including hydrocracking, hydrorefining, ring-opening for jet fuel production, hydrogenation of aromatic hydrocarbons, desulfurization, denitrification, etc.

Therefore, in one embodiment, the present invention relates to a process for hydroprocessing a hydrocarbon which comprises reacting said hydrocarbon with hydrogen at hydroprocessing conditions selected to effect the chemical consumption of hydrogen, and in contact with a catalytic composite of a rhenium component, a germanium component, a Group VIII noble metal component and a porous carrier material.

In another embodiment, the hydroprocessing conditions include a pressure from 400 to about 5,000 p.s.i.g., a liquid hourly space velocity of from 0.1 to about 10.0, a hydrogen concentration of from 500 to about 50,000 s.c.f./bbl. and a maximum catalyst temperature of from 200° F. to about 900° F.

One specific embodiment is directed toward a process for hydroprocessing a hydrocarbon which comprises reacting said hydrocarbon with hydrogen at hydroprocessing conditions, selected to effect chemical consumption of hydrogen, and in contact with a catalytic composite of a rhenium component, a germanium component, a platinum or palladium component and a porous carrier material, said process being further characterized in that said catalytic composite is reduced and sulfided prior to contacting said hydrocarbon.

Another specific embodiment affords a process for producing a cycloparaffinic hydrocarbon which comprises reacting hydrogen and an aromatic hydrocarbon in a reaction zone, in contact with a nonacidic catalytic composite containing 0.01 percent to about 2.0 percent by weight of a rhenium component, from about 0.01 percent to about 5.0 percent by weight of a germanium component, from about 0.01 percent to about 1.5 percent by weight of an alkalinous metal component and from 0.01 percent to about 2.0 percent by weight of a Group VIII noble metal component, calculated as the elements, separating the resulting reaction zone effluent to provide a hydrogen-rich vaporous phase and to recover said cycloparaffinic hydrocarbon.

Another embodiment affords a catalyst comprising a substantially pure faujasite carrier material, at least about 90.0 percent by weight of which is zeolitic, a rhenium component, a germanium component and a Group VIII noble metal component.

Other objects and embodiments of my invention relate to additional details regarding preferred catalytic ingredients, the concentration of components in the catalytic composite, methods of catalyst preparation, individual operating conditions for use in the various hydrocarbon hydroprocesses, preferred processing techniques and similar particulars which are hereinafter given in the following more detailed summary of my invention.

SUMMARY OF INVENTION

As hereinabove set forth, the present invention concerns the hydroprocessing of hydrocarbons and mixtures of hydrocarbons, utilizing a particular catalytic composite. This catalyst comprises a porous carrier material having combined therewith a rhenium component, a germanium component and a Group VIII noble metal component; in many applications, the catalytic composite will also contain a halogen component, and, in some select applications, an alkali metal or alkaline-earth metal component. Considering first the porous carrier material, it is preferred that it be an absorptive, high-surface area support having a surface area of about 25 to about 500 square meters per gram. The porous carrier material is necessarily relatively refractory with respect to the operating conditions employed in the particular hydrocarbon hydroprocess, and it is intended to include those carrier materials which have traditionally been utilized in dual-function hydrocarbon conversion catalysts. In particular, suitable carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous refractory inorganic oxide type, a preferred carrier material constitutes a composite of alumina and silica, with silica being present in an amount of about 10.0 percent to about 90.0 percent by weight.

In many hydroprocessing applications of the present invention, particularly hydrocracking heavy hydrocarbonaceous material to produce lower boiling hydrocarbon products, the carrier material will consist of a crystalline aluminosilicate. This may be naturally occurring, or synthetically prepared, and includes mordenite, faujasite, Type A or Type U molecular sieves, etc., with mordenite and faujasite being preferred. When utilized as the carrier material, the zeolitic material may be in the hydrogen form, or in a form which has been treated with multivalent cations.

As hereinabove set forth, the porous carrier material, for use in the process of the present invention, is a refractory inorganic oxide, and may be either alumina in and of itself, or alumina in combination with one or more other refractory inorganic oxides, and particularly in combination with silica. When utilized as the sole component of the carrier material, the alumina may be of the gamma-, eta-, or theta-alumina type, with gamma- or eta-alumina giving the better results. In addition, preferred carrier materials have an apparent bulk density of about 0.30 to about 0.70 grams per cc. and surface area characteristics indicating an average pore diameter of about 20 to about 300 Angstroms, a pore volume of about 0.10 to about 1.0 milliliters per gram and a surface area of about 100 to about 500 square meters per gram. It is understood that specific methods of preparing the carrier material are not essential to the present invention. For example, an alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina. The carrier material may be formed in any desired shape such as spheres, pills, cakes, extrudates, powders, granules, etc., and may further be utilized in any desired size.

When a crystalline aluminosilicate, or zeolitic material, is intended for use as the carrier, it may be prepared in a number of ways. One common way is to mix solutions of sodium silicate, or colloidal silica, and sodium aluminate, and allow these solutions to react to form a solid crystalline aluminosilicate. Another method is to contact a solid inorganic oxide from the group of silica, alumina, and mixtures thereof, with an aqueous treating solution containing alkali metal cations (preferably sodium) and anions selected from the group of hydroxyl, silicate and aluminate, and allow the solid-liquid mixture to react until the desired crystalline aluminosilicate has been formed. One particular method is especially preferred when the carrier material is intended to be a crystalline aluminosilicate, and a specific illustration thereof is hereafter set forth. This stems from the fact that the method affords a carrier material of substantially pure crystalline aluminosilicate particles. In employing the term "substantially pure," the intended connotation is an aggregate particle at least 90.0 percent by weight of which is zeolitic. Thus, the carrier material is distinguished from an amorphous carrier material, or prior art pills and/or extrudates in which the zeolitic material might be dispersed within an amorphous matrix with the result that only about 40.0 percent to about 70.0 percent by weight of the final particle is zeolitic. The preferred method of preparing the carrier material produces crystalline aluminosilicates of the faujasite modification, and utilizes aqueous solutions of colloidal silica and sodium aluminate. Colloidal silica is a suspension in which the suspended particles are present in a very finely divided form—i.e. having a particle size from about one to about 500 millimicrons in diameter. There are many types of crystalline aluminosilicates which may be produced in a desired size and shape by this preferred method. The type which is produced is primarily dependent upon the conditions under which crystallization occurs, with the $SiO_2/Al_2O_3$ ratio, the $Na_2O/SiO_2$ ratio, the $H_2O/Na_2O$ ratio, temperature and time being the important variables.

After the solid crystalline aluminosilicate has been formed, the mother liquor is separated from the solids by methods including decantation, filtration, etc. The solids are water washed and filtered to remove undesirable ions, and to reduce the quantity of amorphous material, and are then reslurried in water to a solids concentration of about 5.0 to about 50.0 percent by weight. The cake and water are then violently agitated and homogenized until the agglomerates are broken and the solids are uniformly dispersed in what appears to be a colloidal suspension. The suspension is then spray dried by conventional means, such as pressurizing the suspension through an orifice into a hot, dry chamber. The solid particles are withdrawn from the drying chamber and are suitable for forming into finished particles of a desired size and shape. The preferred form of the finished particle is a cylindrical pill, and these may be prepared by introducing the spray dried particles directly into a pilling machine without the addition of any extraneous lubricant or binder. The pilling machines are adjusted to produce particles having a crushing strength of from 2 to 20 pounds, and preferably from 5 to 15 pounds. The pilled faujasite carrier material, of which at least about 90.0 percent by weight is zeolitic, is activated catalytically by converting the sodium form either to the divalent form, the hydrogen form or mixtures thereof.

An essential constituent of the catalytic composite used in the hydrocarbon hydroprocessing scheme of the present invention is a germanium component, and it is a preferred, but not restrictive feature of the catalyst, that the germanium component be present in an oxidation state above that of the elemental metal. That is to say, the germanium component exists within the catalytic composite in either the +2 or +4 oxidation state, the latter being the most likely state. Accordingly, the germanium component will be present in the composite as a chemical compound, such as the oxide, sulfide, halide, etc., or as a chemical combination with the carrier material. On the basis of the evidence currently available, it is believed that the germanium component exists as germanous or germanic oxide. This germanium component may be incorporated in the catalytic composite in any suitable manner known to the art such as by coprecipitation or cogellation with the porous carrier material, ion exchange with the gelled carrier material or impregnation with the carrier material either after or before it is dried and calcined. It is to be noted that it is intended to include within the scope of the present invention all conventional methods for incorporating a metallic component in a catalytic composite and the particular method of incorporation used is not deemed to be an essential feature of the present invention. One method of incorporating the germanium component into the catalytic composite involves coprecipitating the germanium component during the preparation of the carrier material, such as alumina or alumina-silica. This method typically involves the addition of a suitable soluble germanium compound such as germanium tetrachloride to the inorganic oxide hydrosol and then combining the hydrosol with a suitable gelling agent and dropping the resultant mixture into an oil bath maintained at elevated temperatures. The droplets remain in the oil bath until they set and form hydrogel spheres. The spheres are withdrawn from the oil bath and subjected to specific aging treatments in oil and in an ammoniacal solution. The aged spheres are washed and dried at a temperature of about 200° to about 400° F., and thereafter calcined at an elevated temperature of about 850° to about 1,300° F. Further details of spherical particle production may be found in U.S. Pat. No. 2,620,314, issued to James Hoekstra. After drying and calcining the resulting gelled carrier material, an intimate combination of alumina and germanium oxide is obtained.

A preferred method of incorporating the germanium component into the catalytic composite involves the utilization of a soluble, decomposable compound of germanium to impregnate the porous carrier material. In general, the solvent used in this impregnation step is selected on the basis of the capability to dissolve the desired germanium compound, and is preferably an aqueous, or alcoholic solution. Thus, the germanium component may be added to the carrier material by commingling the latter with a solution of a suitable germanium salt or suitable compound of germanium, such as germanium tetrachloride, germanium difluoride, germanium tetrafluoride, germanium di-iodide, germanium monosulfide, and the like compounds. A particularly preferred impregnation solution comprises nascent germanium metal dissolved in chlorine water to yield germanium monoxide. In general, the germanium component can be impregnated either prior to, simultaneously with, or after the Group VIII noble metal component is added to the carrier material. However, I have found that excellent results are obtained when the germanium component is impregnated simultaneously with the Group VIII noble metal component and the rhenium component. In fact, I have determined that a preferred impregnation solution contains chloroplatinic acid, perrhenic acid, hydrogen chloride, and germanous oxide dissolved in chlorine water, especially when the catalyst is intended to contain combined chloride. Following the impregnation step, the resulting composite is dried and calcined.

Regardless of which germanium compound is used in the preferred impregnation step, it is important that the germanium component be uniformly distributed throughout the carrier material. It is preferred to use a volume ratio of impregnation solution to carrier material of at least 1.5:1 and preferably about 2:1 to about 10:1, or more, and to maintain the pH in the range of 1.0 to 7.0. Similarly, it is preferred to use a relatively long contact time during the impregnation step ranging from about one-fourth hour up to about one-half hour or more before drying to remove excess solvent in order to insure a high dispersion of the germanium component on the carrier material. The carrier material is, likewise, preferably constantly agitated during this preferred impregnation step.

As previously indicated, the catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium and iridium. The Group VIII noble metal component, for example platinum, may exist within the final catalytic composite as a compound such as an oxide, sulfide, halide, etc., or in an elemental state. The Group VIII noble metal component generally comprises about 0.01 percent to about 2.0 percent by weight of the final composite, calculated on an elemental basis. In addition to platinum, another particularly preferred Group VIII noble metal component is palladium, or a compound of palladium.

The Group VIII noble metal component may be incorporated within the catalytic composite in any suitable manner including coprecipitation or cogellation with the carrier material, ion exchange, or impregnation. A preferred method of preparation involves the utilization of a water-soluble compound of a Group VIII noble metal component in an impregnation technique. Thus, a platinum component may be added to the carrier material by commingling the latter with an aqueous solution of chloroplatinic acid. Other water-soluble compounds of platinum may be employed, and include ammonium chloroplatinate, platinum chloride, dinitro diamino platinum, etc. The use of a platinum chloride compound, such as chloroplatinic acid, is preferred since it facilitates the incorporation of both the platinum component and at least a minor quantity of the halogen component in a single step. In addition, it is generally preferred to impregnate the carrier material after it has been calcined in order to minimize the risk of washing away the valuable Group VIII noble metal compounds; however, in some instances it may prove advantageous to impregnate the carrier material when it exists in a gelled state.

Regardless of how the components of the catalyst are combined with the carrier material, the final composite will generally be dried at a temperature of about 200° to about 600° F., for a period of from 2 to about 24 hours or more, and finally calcined at a temperature of about 700° to about 1100° F. in an atmosphere of air, for a period of about 0.5 to about 10 hours in order to convert the metallic components substantially to the oxide form. When the carrier material constitutes a crystalline aluminosilicate, it is preferred that the calcination temperature not exceed about 1,000° F.

Another essential component of the catalytic composite is a rhenium component. This component may also be present as an elemental metal, as a chemical compound such as the oxide, sulfide, halide, etc., or in a physical or chemical combination with the porous carrier material and/or other components of the catalytic composite. The rhenium component is usually utilized in an amount sufficient to result in a final catalytic composite containing about 0.01 to about 2.0 percent by weight of rhenium, calculated on an elemental basis. The rhenium may be incorporated within the catalytic composite in any suitable manner, and during any selected stage in the preparation of the catalyst. It is generally advisable to incorporate the rhenium component by way of an impregnation step after the porous carrier material has been formed in order that the expensive metal will not be lost due to washing and purification techniques applied to the carrier material during the course of its preparation. Although any suitable method for incorporating a catalytic component into a porous carrier material can be utilized to incorporate the rhenium component, the preferred procedure involves impregnation of the porous carrier material. The impregnating solution can, in general, be a solution of a suitable soluble, decomposable rhenium salt such as ammonium perrhenate, sodium perrhenate, potassium perrhenate, and the like salts. In addition, solutions of rhenium halides such as rhenium chloride, rhenium fluoride, etc., may be used, with the preferred impregnating solution being an aqueous solution of perrhenic acid. The porous carrier material can be impregnated with the rhenium component either prior to, simultaneously with, or after the other components herein mentioned have been combined therewith. Best results are ordinarily achieved when the rhenium component is impregnated simultaneously with the germanium and Group VIII noble metal. As previously stated, excellent results have been obtained with a one-step impregnation technique utilizing an aqueous solution of chloroplatinic acid, perrhenic acid, hydrochloric acid and germanous oxide dissolved in chlorine water.

Although not essential to successful hydroprocessing in all cases, in fact detrimental in some, it is preferred to incorporate a halogen component into the catalytic composite. Accordingly, one catalyst composite, for utilization in hydrocarbon hydroprocessing, comprises a combination of a germanium component, a rhenium component, a halogen component and a noble metal component. Although the precise form of the chemistry of the association of the halogen component with the carrier material and metallic components is not accurately known, it is customary in the art to refer to the halogen component as being combined with the carrier material, or with the other ingredients of the catalyst. The combined halogen may be either fluorine, chlorine, iodine, bromine, or mixtures thereof. Of these, fluorine and particularly chlorine are preferred for the hydroprocesses encompassed by the present invention. The halogen may be added to the carrier material in any suitable manner, and either during preparation of the carrier, or before, or after the addition of the other components. For example, the halogen may be added at any stage in the preparation of the carrier material, or to the calcined carrier material, and in the form of an aqueous solution of an acid such as hydrogen fluoride, hydrogen chloride, hydrogen bromide, hydrogen iodide, etc. The halogen component or a portion thereof may be composited with the carrier material during the impregnation of the latter with either the rhenium component, the germanium component, or both. The hydrosol, which is typically utilized to form the amorphous carrier material, may contain halogen and thus contribute at least a portion of the halogen component to the final composite. The quantity of halogen is such that the final catalytic composite contains about 0.1 to about 3.5 percent by weight, and preferably from about 0.5 to about 1.5 percent by weight, calculated on the basis of the elemental halogen.

When used in many of the hydrogen-consuming processes hereinbefore described, the foregoing quantities of metallic components will be combined with a carrier material of alumina and silica, wherein the silica concentration is 10.0 to about 90.0 percent by weight. In processes where the natural acid function of the catalytic composite must necessarily be attenuated, the metallic components will be combined with a carrier material consisting essentially of alumina. In this latter situation, a halogen component is often not combined with the catalytic composite, and the inherent acid function of the dual-function catalytically active metallic component is further attenuated through the addition of from 0.01 to about 1.5 percent by weight of an alkalinous metal component. One such process, in which the acid function of the catalyst must necessarily be attenuated, is the process wherein an aromatic hydrocarbon is hydrogenated to produce the corresponding cycloparaffin. Specifically, a benzene concentrate is often used as the starting material for the production of cyclohexane, primarily to satisfy the demand thereof in the manufacture of nylon. In order to avoid ring-opening, which results in loss of both the benzene and the cyclohexane product, an alkalinous metal component is combined with the catalytic composite in an amount of from 0.01 to about 1.5 percent by weight. This component is selected from the group of lithium, sodium, potassium, rubidium, cesium, barium, strontium, calcium, magnesium, beryllium, mixtures of two or more, etc. In general, more advantageous results are achieved through the use of the alkali metals, particularly lithium and/or potassium.

Regarding the preferred amounts of the various metallic components of the catalyst, I have found it to be a good practice to specify the quantities of the rhenium component and the germanium component as a function of the amount of the noble metal component. On this basis, the amount of the rhenium component is ordinarily selected so the atomic ratio of rhenium to the noble metal component is about 0.1:1.0 to about 3.0:1.0. Similarly, the amount of the germanium component is ordinarily selected to produce a composite containing an atomic ratio of germanium to noble metal of about 0.25:1.0 to about 6.0:1.0.

Another significant parameter for the subject catalyst is the "total metals content" which is defined to be the sum of the noble metal component, the rhenium component, and the germanium component, calculated on an elemental germanium, rhenium and noble metal basis. Good results are ordinarily obtained with the subject catalyst when this parameter is fixed at a value of about 0.15 to about 4.0 percent by weight, with best results ordinarily achieved at a metals loading of about 0.3 to about 2.0 percent by weight.

Correlating the above discussion of each of the essential and preferred components of the catalytic composite, it is evident that a particularly preferred catalytic composite comprises a combination of a Group VIII noble metal component, a rhenium component, a germanium component, often with a halogen component, and a porous carrier material in amounts sufficient to result in the composite containing about 0.5 to about 1.5 percent by weight of halogen, about 0.05 to about 1.0 percent by weight of a noble metal component, about 0.05 to about 1.0 percent by weight of rhenium and about 0.05 to about 2.0 percent by weight of germanium. Accordingly, specific examples of especially preferred catalytic composites, containing, for example, platinum, are as follows: (1) a catalytic composite comprising a combination of 0.5 percent by weight of germanium, 0.5 percent by weight of rhenium, 0.75 percent by weight of platinum, and about 0.5 to about 1.5 percent by weight of halogen; (2) a catalytic composite comprising a combination of 0.1 percent by weight of germanium, 0.1 percent by weight of rhenium, 0.1 percent by weight of platinum, and about 0.5 to about 1.5 percent by weight of halogen; (3) a catalytic composite comprising a combination of about 0.375 percent by weight of germanium, 0.375 percent by weight of rhenium, 0.375 percent by weight of platinum, and about 0.5 to about 1.5 percent by weight of halogen; (4) a catalytic composite comprising a combination of 0.2 percent by weight of germanium, 0.1 percent by weight of rhenium, 0.5 percent by weight of platinum, and about 0.5 to about 1.5 percent by weight of halogen; (5) a catalytic composite comprising a combination of 0.5 percent by weight of germanium, 0.25 percent by weight of platinum, 0.25 percent by weight of rhenium, and about 0.5 to about 1.5 percent by weight of halogen; and, (6) a catalytic composite comprising a combination of 1.0 percent by weight of germanium, 0.5 percent by weight of rhenium, 0.5 percent by weight of platinum, and about 0.5 to about 1.5 percent by weight of halogen. The amounts of the components reported in these examples are, of course, calculated on an elemental basis. As hereinbefore set forth, the halogen component of the foregoing described specific composites may be eliminated where either necessary, or desired. In those instances where a halogen component is utilized in the catalyst, it has been determined that more advantageous results are obtained when the halogen content of the catalyst is adjusted during the calcination step through the inclusion of a halogen, or a halogen-containing compound in the air atmosphere. In particular, when the halogen component is chlorine, for example, it is preferred to use a mole ratio of water to hydrochloric acid to about 20:1 to about 100:1 during at least a portion of the calcination step in order to adjust the final chlorine content of the composite to a range of about 0.5 to about 1.2 percent by weight.

Prior to its use, in the hydroprocessing of hydrocarbons, the resultant calcined catalytic composite may be subjected to a substantially water-free reduction technique. This technique is designed to insure a more uniform and finely divided dispersion of the metallic components throughout the carrier material. Preferably, substantially pure and dry hydrogen (i.e. less than about 30.0 volume p.p.m. of water) is employed as the reducing agent. The calcined catalyst is contacted at a temperature of about 800° to about 1,200° F., and for a period of about 0.5 to about 10 hours, or more, and effective to substantially reduce the metal components. This reduction technique may be performed in situ as part of a startup sequence provided precautions are observed to predry the unit to a substantially water-free state, and if substantially water-free hydrogen is employed.

Again with respect to effecting hydrogen-consuming reactions, the process is generally improved when the reduced composite is subjected to a presulfiding operation designed to incorporate from about 0.05 to about 0.50 percent by weight of sulfur, on an elemental basis. This presulfiding treatment takes place in the presence of hydrogen and a suitable sulfur-containing compound including hydrogen sulfide, lower molecular weight mercaptans, organic sulfides, carbon disulfide, etc. This procedure involves treating the reduced catalyst with a sulfiding gas, such as a mixture of hydrogen and hydrogen sulfide, and at conditions sufficient to effect the desired incorporation of sulfur. These conditions include a temperature of from about 50° to about 1,100° F. It is generally considered a good practice to perform the presulfiding technique under substantially water-free conditions.

According to the present invention, a hydrocarbon charge stock and hydrogen are contacted with a catalyst of the type described above in a hydrocarbon conversion zone. As hereinafter indicated, the particular catalyst employed is primarily dependent upon the characteristics of the charge stock, as well as the desired end result and the particular hydroprocessing scheme. The contacting may be accomplished by using the catalyst in a fixed-bed system, a moving-bed system, a fluidized-bed system, or in a batch-type operation; however, in view of the risk of attrition loss of the catalyst, it is preferred to use the fixed-bed system. Furthermore, it is well known that a fixed-bed catalytic system offers many operational advantages. In this type of system, a hydrogen-rich gaseous phase and the charge stock are preheated by any suitable heating means to the desired reaction temperature, the mixture being passed into the conversion zone containing the fixed-bed of the catalytic composite. It is understood, of course, that the conversion zone may be one or more separate reactors having suitable means therebetween to insure that the desired conversion temperature is maintained at the entrance to the catalyst bed. It should also be noted that the reactants may be contacted with the catalyst bed in either upward, downward or radial flow fashion, with a downward/radial flow being preferred. Additionally, the reactants may be in the liquid phase, a mixed liquid-vapor phase or a vapor phase when they contact the catalyst.

The operating conditions imposed upon the reaction zones are dependent upon the particular hydroprocessing being effected. However, these operating conditions will include a pressure from about 400 to about 5,000 p.s.i.g., an LHSV (liquid hourly space velocity) of about 0.1 to about 10.0, and a hydrogen concentration within the range of about 500 to about 50,000 s.c.f./bbl. In view of the fact that the reactions being effected are exothermic in nature, an increasing temperature gradient is experienced as the hydrogen and feed stock traverse the catalyst bed. For any given hydrogen-consuming process, it is desirable to maintain a maximum catalyst bed temperature below about 900° F., which temperature is virtually identical to that as may be conveniently measured at the outlet of the reaction zone. Hydrogen-consuming processes are conducted at a temperature within the range of about 200° to about 900° F., and it is intended herein that the stated temperature of operation alludes to the maximum catalyst bed temperature. In order to assure that the catalyst bed temperature does not exceed the maximum allowed for a given process, the use of conventional quench streams, either normally liquid or gaseous, introduced at one or more intermediate loci of the catalyst bed, may be utilized. In some of the hydroprocesses encompassed by the present invention, especially where hydrocracking a heavy hydrocarbonaceous material to produce lower boiling hydrocarbon products, that portion of the normally liquid product effluent boiling above the end point of the desired product will be recycled to combine with such hydrocarbon charge stock. In these situations, the combined liquid feed ratio (defined as volumes of total liquid charge to the reaction zone per volume of fresh feed charge to the reaction zone) will be within the range of about 1.1 to about 6.0.

METHODS OF CATALYST PREPARATION

Many of the hydroprocessing schemes, encompassed by my invention, will utilize an amorphous carrier material. As hereinbefore stated, when the amorphous carrier is a composite of both alumina and silica, the silica content will be from 10.0 to 90.0 percent by weight. One such alumina-silica composite, containing 75.0 percent by weight of silica, may be prepared by diluting 3,220 grams of water glass (28.0 percent by weight of $SiO_2$) with 6,440 cc. of water, adding 800 cc. of hydrochloric acid and an additional 1,600 cc. of water. The resulting acidified silica hydrosol is then added to 3,160 cc. of an aluminum sulfate solution having a gravity of 1.28. The alumina-silica hydrosol is then commingled, accompanied by vigorous stirring, with 2,560 cc. of an aqueous solution of ammonium hydroxide containing 1,280 cc. of a 28.0 percent by weight solution of ammonia. The resulting hydrogel is filtered and water washed, and dried at a temperature of about 300° F. The dried composite is ground to a talclike powder and formed into ⅛-inch by ⅛-inch cylindrical pills. The pills are subjected to high-temperature calcination, in an atmosphere of air, for a period of 3 hours at a temperature of about 1,150° F.

A measured amount of germanium dioxide crystals is placed in a porcelain boat and subjected to a reduction treatment with substantially pure hydrogen at a temperature of about 650° C. for about 2 hours. The resulting grayish-black solid material is dissolved in chlorine water to form an aqueous solution of germanium monoxide. An aqueous solution containing chloroplatinic acid, perrhenic acid, and hydrogen chloride is prepared. The two solutions are then intimately admixed and used to impregnate the cylindrical pills in amounts, respectively, calculated to result in a final composite containing 0.1 percent by weight rhenium, 0.2 percent by weight germanium and 0.5 percent by weight platinum. In order to insure uniform distribution of the metallic components throughout the carrier material, this impregnation step is preferably performed by adding the carrier material particles to the impregnation mixture with constant agitation. In addition, the volume of the solution is twice the volume of the carrier material particles. The impregnation mixture is maintained in contact with the carrier material particles for a period of about one-half hour at a temperature of about 70° F. Thereafter, the temperature of the impregnation mixture is raised to about 225° F. and the excess solution evaporated over a period of about 1 hour. The resulting dried particles are then subjected to a calcination treatment in an air atmosphere at a temperature of about 925° F. for about 1 hour. The calcined pills are then contacted with an air stream containing water and hydrochloric acid in a mole ratio of about 40:1 for about 4 hours at 975° F. in order to adjust the halogen content of the final catalyst particles to a level of about 0.90.

Thereafter, the catalyst particles are subjected to a dry prereduction treatment by contacting them with a substantially pure hydrogen stream containing less than 20 vol. p.p.m. of water at a temperature of about 1,000° F., a pressure slightly above atmospheric and a flow rate of the hydrogen stream through the catalyst particles corresponding to a gas hourly space velocity of about 720. This prereduction step is effected for a duration of about 1 hour.

When zeolitic in nature, the carrier material is preferably substantially pure faujasite. The following constitutes one method of preparing the zeolitic catalyst.

Solid sodium aluminate in an amount of about 78 grams, and containing about 46.0 percent by weight $Al_2O_3$ and 31.0 percent by weight $Na_2O$ is dissolved in about 952 cc. of water to form a sodium aluminate solution. To this solution is added about 194.4 grams of sodium hydroxide pellets (98.0 percent by weight NaOH). This mixture is cooled to 75° F., and a silica solution containing 35.0 percent by weight $SiO_2$ and weighing 1,180 grams is slowly added thereto over a period of about 15 minutes. The resulting solution is stirred gently for about 1 hour at ambient temperature, followed by a quiescent age for 20 hours with occasional gentle stirring during the 20-hour period. This mixture is heated to about 95° C. via one pass pumping through a heat exchanger into a glass lined vessel. This mixture is aged quiescently at about 95° C. for a period of 48 hours. The mother liquor is separated from the formed crystals by decantation. Water is added to the vessel and the crystals are water washed until most of the silicate ions have been removed. The water washed crystals are reslurried in water to a solids concentration of about 20.0 percent by weight. The reslurried mixture is pressured through an orifice into a hot chamber at conditions to produce spray dried particles of about 65 microns in average diameter. The spray dried particles are introduced into a pilling machine where they are satisfactorily pilled into ⅛-inch by ⅛-inch cylinders having from about 5 to about 10 pounds crushing strength. These pills are analyzed and shown to be substantially pure faujasite; that is, about 94.0 percent by weight is zeolitic. The pills are dried at a temperature of about 300° F. for a period of about 3 hours and calcined in air for a period of 1 hour at a temperature of about 950° F.

An impregnation solution is prepared to contain a chlorine water solution of germanous oxide, perrhenic acid, chloropalladic acid and hydrochloric acid, and the faujasitic pills are impregnated, dried and calcined as hereinbefore described with respect to the amorphous alumina/silica pills. Analysis indicates a composite of 0.85 percent by weight of chloride, 0.5 percent by weight of palladium, 0.1 percent by weight of rhenium and 0.2 percent by weight of germanium.

Specific operating conditions, processing techniques, particular catalytic composites and other individual process details will be given in the following description of several of the hydroprocessing schemes to which the present invention is applicable. These will be presented by way of examples given in conjunction with commercially scaled operating units.

EXAMPLES

In presenting these examples, it is not intended that the present invention be limited to the specific illustrations, nor is it intended that a given hydrotreating process be limited to the particular operating conditions, catalytic composites, processing techniques, charge stocks, etc. It is understood, therefore, that the present invention is merely illustrated by the specifics hereinafter set forth.

EXAMPLE I

In this example, the process of the present invention is illustrated as being applied to the hydrogenation of aromatic hydrocarbons such as benzene, toluene, the various xylenes, naphthalenes, etc., to form the corresponding cyclic paraffins. When applied to the hydrogenation of aromatic hydrocarbons which are contaminated by sulfurous compounds, and especially thiophenic compounds, the process is advantageous in that it affords 100.00 percent conversion without the necessity for the substantially complete and prior removal of the sulfur compounds. The corresponding cyclic paraffins, resulting from the hydrogenation of the aromatic nuclei, include compounds such as cyclohexane, mono-, di-, tri-substituted cyclohexanes, decahydronaphthalene, tetrahydronaphthalene, etc., which find widespread use in a variety of commercial industries in the manufacture of nylon and as a solvent for various fats, oils, waxes, etc.

Aromatic concentrates are obtained by a multiplicity of techniques. For example, a benzene-containing fraction may be subjected to distillation to provide a heart-cut which contains the benzene. This is then subjected to a solvent extraction process which separates the benzene from the normal or iso-paraffinic components, as well as the naphthenes contained therein. Benzene is readily removed from the selected solvent by way of distillation, and in a purity of 99.0 percent, or more. Large quantities of benzene are also available as the product stream from hydrodealkylation units.

Heretofore, the hydrogenation of aromatic hydrocarbons, for example benzene, has been effected with a nickel-containing catalyst at hydrogenation conditions. This is extremely disadvantageous in many respects, and especially from the standpoint that nickel is quite sensitive to the minor quantity of sulfurous compounds which may be contained in the benzene concentrate. In accordance with the present process, the benzene is hydrogenated in contact with a nonacidic catalytic composite containing 0.01 to about 2.0 percent by weight of a rhenium component, from about 0.01 to about 5.0 percent by weight of a germanium component, from 0.01 to about 2.0 percent by weight of a noble metal component and from about 0.01 to about 1.5 percent by weight of an alkalinous metal component. Operating conditions include a maximum catalyst bed temperature in the range of about 200° to about 800° F., a pressure of from 400 to about 2,000 p.s.i.g., an LHSV (liquid hourly space velocity) of from about 1.0 to about 10.0 and a hydrogen concentration in an amount sufficient to yield a mole ratio of hydrogen to cyclohexane in the product effluent from the last reaction zone, not substantially less than about 4.0:1. One operating technique involves the use of three reaction zones, each one of which preferably contains approximately one-third of the total quantity of the catalyst employed. The process is further facilitated when the total fresh benzene is added in three portions, preferably but not necessarily approximately equal, one each to the inlet of each of the three reaction zones. While the benzene, therefore, passes in parallel flow through the reaction zones, the hydrogen and cyclohexane recycle pass in series flow through the reaction zones.

In the current example, the catalyst utilized is a substantially halogen-free alumina carrier material combined with about 0.5 percent by weight of germanium, 0.375 percent by weight of rhenium, 0.375 percent by weight of platinum and about 0.80 percent by weight of lithium, all of which are calculated on the basis of the elemental metals. The hydrogenation process will be described in connection with a commercially scaled unit having a fresh benzene feed capacity of about 5,200 bbl./day. The benzene-rich fresh feed is the product stream from an hydrodealkylation unit operating in combination with the hydrogenation unit; thus, on a moles/hr. basis of 660.35, the total amount of benzene is 591.35 moles/hr., while the cyclohexane content is 41.58 moles/hr., the remaining 27.42 moles/hr. constituting principally pentanes and lighter hydrocarbons.

Makeup gas, rich in hydrogen, to supplant that chemically consumed in the process, lost by dissolution in the product stream and vented to provide process pressure control, is supplied in part from the hydrodealkylation unit (2,900 moles/hr.) and in part from a catalytic reforming unit (1159.80 moles/hr.). The total quantity of hydrogen only, inclusive of that recycled internally, is 3,912.96 moles/hr. The total gaseous material is admixed with a cyclohexane-rich recycle stream in an amount of 368.06 moles/hr., of which about 310.70 is cyclohexane. The total fresh benzene feed is divided into three substantially equal portions of 220.12 moles/hr., one of which is admixed with the cyclohexane/hydrogen mixture. Following suitable heat exchange with various hot effluent streams, the total feed to the first reaction zone is at a temperature of 350° F. and a pressure of 470 p.s.i.g. The reaction zone effluent is at a temperature of 565° F. and a pressure of about 465 p.s.i.g. The total effluent from the first reaction zone is utilized as a heat exchange medium, in a steam generator, whereby the temperature is reduced to a level of about 405° F. The cooled effluent is admixed with about 220.12 moles per hour of fresh benzene concentrate, the resulting temperature being 350° F. The mixture enters the second reaction zone at a pressure of about 455 p.s.i.g. The second reaction zone effluent, at a pressure of 450 p.s.i.g. and a temperature of 560° F. is also utilized as a heat exchange medium to generate steam whereby the temperature is reduced to a level of about 375° F. Upon being admixed with 220.12 moles per hour of fresh benzene concentrate, the temperature is again 350° F., and the mixture enters the third reaction zone at a pressure of about 440 p.s.i.g. The third reaction zone effluent is at a temperature of about 550° F. and a pressure of about 435 p.s.i.g. Again, through the utilization of the effluent as a heat-exchange medium, the temperature is reduced to a level of about 200° F., and subsequently reduced to a level of about 90° F., through the use of an air-cooled condenser. The cooled third reaction zone effluent is introduced into a high pressure separator, at a pressure of about 400 p.s.i.g.

A hydrogen-rich vaporous phase is withdrawn from the high pressure separator and is recycled by way of compressive means, at a pressure of about 470 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column, often referred to as a reboiled stripping column, functioning at an operating pressure of about 250 p.s.i.g., a top temperature of about 160° F. and a bottom temperature of about 430° F. The cyclohexane product is withdrawn from the stabilizer as a bottoms stream, the overhead stream being vented to fuel. The cyclohexane concentrate is recovered in an amount of about 597.92 moles per hour, of which only about 0.29 moles per hour constitutes other hexanes, inclusive of methylcyclohexanes. In brief summation, of the 50,490 pounds per hour of fresh benzene feed (including all other liquid and vapor constituents) 50,340 pounds per hour of cyclohexane product is recovered.

EXAMPLE II

Another hydrocarbon hydroprocessing scheme, to which the present invention is applicable, involves the hydrorefining of coke-forming hydrocarbon distillates. These distillates are generally sulfurous in nature, and contain mono-olefinic, di-olefinic and aromatic hydrocarbons. Through the utilization of a catalytic composite comprising both a germanium component, a rhenium component and a Group VIII noble metal component, increased selectivity and stability of operation if obtained; selectivity is most noticeable with respect to the retention of aromatic hydrocarbons, and in hydrogenating conjugated di-olefinic and mono-olefinic hydrocarbons. Such charge stocks generally result from diverse conversion processes including the catalytic and/or thermal cracking of petroleum, sometimes referred to as pyrolysis, the destructive distillation of wood or coal, shale oil retorting, etc. The impurities in these distillate fractions must necessarily be removed before the distillates are suitable for their intended use, or which when removed, enhance the value of the distillate fraction for further processing. Frequently, it is intended that these charge stocks be substantially desulfurized, saturated to the extent necessary to remove the conjugated di-olefins, while simultaneously retaining the aromatic hydrocarbons. When subjected to hydrotreating for the purpose of removing the contaminating influences, there is encountered difficulty in effecting the desired degree of reaction due to the formation of coke and other carbonaceous material.

As utilized herein, hydrogenating is intended to be synonymous with hydrorefining. The purpose is to provide a highly selective and stable process for hydrogenating coke-forming hydrocarbon distillates accompanied by aromatic retention, and this is accomplished through the use of a fixed-bed catalystic reaction system. There exist two separate, desirable routes for the treatment of coke-forming distillates, for example, a pyrolysis naphtha byproduct. One such route is directed toward a product suitable for use in certain gasoline blending. With this as the desired object, the process can be effected in a single stage, or reaction zone, with the catalytic composite hereinafter specifically described as the first-stage catalyst. The attainable selectivity in this instance resides primarily in the hydrogenation of highly reactive double bonds. In the case of conjugated di-olefins, the selectivity restricts the hydrogenation to produce mono-olefins, and, with respect to the styrenes, the hydrogenation is inhibited to produce alkylbenzenes without "ring" saturation. The selectivity is accomplished with a minimum of polymer formation either to "gums" or polymers of lower molecular weight which would necessitate a rerunning of the product effluent prior to blending to gasoline. Other advantages of restricting the hydrogenation of the conjugated di-olefins and styrenes include: lower hydrogen consumption, lower heat of reaction and a higher octane rating gasoline boiling range product. Also, the nonconjugated di-olefins, such as 1,5 normal hexadiene are not usually offensive in suitably inhibited gasolines, in some locales, and will possibly not react to this first stage. Some fresh charge stocks are sufficiently low in mercaptan sulfur content that direct gasoline blending may be considered. Such considerations are generally applicable to foreign markets, particularly European, where olefinic and sulfur-containing gasolines have not become too critical. It must be noted that the sulfurous compounds, and the mono-olefins, whether virgin, or products of di-olefin partial saturation, are unchanged in the single, or first-stage reaction zone. Where, however, the desired end result is aromatic hydrocarbon retention, intended for subsequent extraction, the two-stage route is required. The mono-olefins must be substantially saturated in the second stage to facilitate aromatic extraction by way of currently practiced methods. Thus, the desired necessary second-stage hydrogenation involves saturation of the mono-olefins, as well as sulfur removal, the latter required for an acceptable aromatic product. Attendant upon this is the necessity to avoid even partial saturation of aromatic nuclei.

With respect to one preferred catalytic composite, its principal function involves the selective hydrogenation of conjugated di-olefinic hydrocarbons to mono-olefinic hydrocarbons. This particular catalytic composite possesses unusual stability notwithstanding the presence of sulfurous compounds in the fresh charge stock. The catalytic composite comprises an alumina-containing refractory inorganic oxide, a germanium component, a rhenium component, an alkali metal component, the latter being preferably potassium and/or lithium, and a platinum or palladium component. It is especially preferred, for use in this particular hydrocarbon hydroprocessing scheme, that the catalytic composite be substantially free from any "acid-acting" propensities. The catalytic composite, utilized in the second reaction zone, for the primary purpose of effecting the destructive conversion of sulfurous compounds into hydrogen sulfide and hydrocarbons, is a composite of an alumina-containing refractory inorganic oxide, a rhenium component, a germanium component and a platinum or palladium component. Through the utilization of a particular sequence of processing steps, the use of the foregoing described catalytic composites inhibits the formation of high molecular weight polymers and copolymers to a degree that permits processing for an extended period of time. Briefly, this is accomplished by initiating the hydrorefining reactions at temperatures below about 500° F., at which temperature the coke-forming reactions are not promoted. The operating conditions within the second reaction zone are such that the sulfurous compounds are removed without incurring the detrimental polymerization reactions otherwise resulting were it not for the saturation of the conjugated di-olefinic hydrocarbons within the first reaction zone.

The hydrocarbon charge stock, for example a naphtha byproduct (butane-350° F. end point) from a commercial cracking unit designed and operated for the production of ethylene, having a gravity of about 39.1° API, a bromine number of about 66.0, a diene value of about 85.5 and containing about 200 p.p.m. by weight of sulfur and 64.5 vol. percent aromatic hydrocarbons, is admixed with recycled hydrogen. The hydrogen concentration is within the range of about 1,500 to about 10,000 s.c.f./bbl., and preferably in the range of from 1,500 to about 6,000 s.c.f./bbl. The charge stock is heated to a temperature in a range of from about 200° F. to about 500° F., and preferably to a temperature above about 300° F., (340° F.) by way of heat exchange with various product effluent streams, and is introduced into the first reaction zone at an LHSV in the range of about 0.5 to about 10.0 (1.0). The reaction zone is maintained at a pressure of from 400 to about 1,000 p.s.i.g., and preferably at a level in the range of from 500 p.s.i.g. to about 900 p.s.i.g.

The temperature of the product effluent from the first reaction zone (440° F.) is increased to a level above about 500° F. and preferably in the range of about 500° F. to about 800° F. (625° F.). When the process if functioning efficiently, the diene value of the liquid charge entering the second catalytic reaction zone is less than about 1.0, and often less than about 0.5. The conversion of sulfurous compounds and nitrogenous compounds (where present in the charge stock), as well as the saturation of mono-olefins, contained within the first zone effluent, is effected in the second zone. The second catalytic reaction zone is maintained under an imposed pressure of from 400 to about 1,000 p.s.i.g., and preferably at a level of from about 500 to about 900 p.s.i.g. The two-stage process is facilitated when the focal point for pressure control is the high-pressure separator (750 p.s.i.g.) serving to separate the product effluent from the second catalytic reaction zone. It will, therefore, be maintained at a pressure slightly less than the first catalytic reaction zone as a result of fluid flow through the system. The LHSV through the second reaction zone is about 0.5 to about 10.0 (3.0), based upon fresh feed only. The hydrogen concentration will be in a range of from 1,000 to about 10,000 s.c.f./bbl., and preferably from about 1,000 to about 8,000 s.c.f./bbl. Series flow through the entire system is facilitated when the recycle hydrogen is admixed with the fresh hydrocarbon charge stock. Makeup hydrogen, to supplant that consumed in the overall process (881 s.c.f./bbl. overall) may be introduced from any suitable external source, but is preferably introduced into the system by way of the effluent line from the first catalytic reaction zone to the second catalytic reaction zone.

With respect to the normally liquid portion of the product effluent, including butanes, the aromatic concentration is about 64.0 percent by volume, the bromine number is about 0.3 and the diene value is essentially nil.

With charge stocks having exceedingly high diene values, a recycle diluent is employed in order to prevent an excessive temperature rise in the reaction system. Where so utilized, the source of the diluent is preferably a portion of the normally liquid effluent from the second catalytic reaction zone. The precise quantity of recycle material varies from feed stock to feed stock; however, the rate at any given time is simply controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0, or less, the quantity of recycle diluent may be lessened, thereby decreasing the combined liquid feed ratio.

A thermally cracked gasoline from an ethylene unit, having a gravity of 42.7° API and a boiling range from $C_5$ to 375° F. end point, is prefractionated to provide a $C_6$ to $C_8$ aromatic-rich heart cut. The charge stock has a boiling range of 165° to 295° F. and a gravity of 34.4° API. The contaminants include 200 p.p.m. by weight of sulfur, a bromine number of 40.0 and a diene value of about 25. This commercially-scaled unit is designed to process 5,000 bbl./day of the $C_6$ to $C_8$ fraction. Since the desired end result is the production of an aromatic-rich, desulfurized and olefin-free product, the process is effected in two stages; the first stage contains a catalytic composite of alumina, 0.20 percent by weight of germanium, 0.375 percent by weight of platinum, 0.375 percent by weight of rhenium and 0.5 percent by weight of lithium.

The 5,000 bbl./day of aromatic concentrate, 77.0 percent $C_6$–$C_8$ aromatics by volume, is supplied by way of a depentanizer and rerun column. The rerun column overhead is at a temperature of 180° F.; this admixed with 1,250 bbl./day of a recycled diluent (combined liquid feed ratio of about 1.25) and 1,000 s.c.f./bbl. of a hydrogen-rich recycle gas phase based on combined feed. The mixture, at a temperature of 195° F., is subjected to heat exchange with various hot effluent streams to raise its temperature to 250° F. The material enters the first reaction zone at a pressure of 860 p.s.i.g., and contacts the catalytic composite at a LHSV of 3.0, based on combined liquid feed. The product effluent emanates from the first reaction zone at a pressure of about 850 p.s.i.g. and a temperature of about 310° F. The temperature of the first reaction zone product effluent is increased to a level of about 600° F., and is introduced into the second reaction zone under a pressure of about 790 p.s.i.g. The LHSU, inclusive of the recycle diluent is 3.75 and the hydrogen circulation rate is about 1,500 s.c.f./bbl., inclusive of makeup hydrogen and based on combined liquid feed. The second reaction zone contains a catalyst of a composite of alumina, 0.37 percent by weight of rhenium, 0.37 percent by weight of germanium and 0.37 percent palladium. The reaction product effluent is introduced, following its use as the heat exchange medium and further cooling its reduce its temperature from 650° F. to a level of about 350° F. (720 p.s.i.g. at this stage), into a hot separator. A liquid phase in an amount of 3,269 bbl./day is removed as a bottoms stream, of which 1,250 bbl./day is recycled to combine with the fresh feed to the first reaction zone. A vaporous phase is cooled to a temperature of 100° F., and is introduced into a cold separator at a pressure of about 720 p.s.i.g. The cold separator serves to provide the hydrogen-rich recycle gas phase and a normally liquid stream (3,348 bbl./day) which is combined with 2,019 bbl./day of net hot separator liquid. In order to maintain process pressure control, a portion of the vapor phase from the cold separator is vented.

The 5,367 bbl./day of normally liquid product is introduced into a reboiled stripping column which serves to remove hydrogen sulfide and light hydrocarbons, and to concentrate the $C_6$ to $C_8$ aromatics as a bottoms stream. Conditions generally imposed on the stripping column are a top pressure of 155 p.s.i.g., a top temperature of 316° F., a bottom pressure of 160 p.s.i.g. and a bottom temperature of 419° F. The bottoms product stream is recovered in an amount of 5,087 bbl./day (686.02 moles/hr.), and analyses indicate an aromatic concentration of about 76.6 percent by volume: the sulfur concentration is about 0.5 p.p.m., and both the diene value and bromine number are essentially "nil." The following table I indicates the yield and distribution, based upon 690.86 moles/hr. of fresh feed, exclusive of the 686,02 moles/hr. of aromatic product. In the table the yields are inclusive of the cold separator and stripper vent gas streams. The component analysis of the makeup hydrogen gas stream is presented for the sake of completeness.

TABLE I

Hydrogenation Distribution, moles/hr.

| Component | Makeup Gas | Vent Gases |
|---|---|---|
| Hydrogen Sulfide | 1.42 | 1.82 |
| Hydrogen | 534.30 | 285.30 |
| Methane | 134.64 | 135.04 |
| Fthane | 32.06 | 32.36 |
| Propane | 7.12 | 7.22 |
| iso-Butane | 0.87 | 0.97 |
| n-Butane | 1.28 | 1.38 |
| iso-Pentane | 0.43 | 0.53 |
| n-Pentane | 0.28 | 0.38 |
| $C_6$-plus | | 4.84 |

It should be noted that the indicated minor degree of cracking, evidenced by only a slight increase in $C_1$–$C_5$ yield, illustrates the high degree of selectivity possessed by the germanium-rhenium-noble metal catalyst for hydrogenating coke-forming distillates.

EXAMPLE III

This example illustrates still another hydrocarbon hydroprocessing scheme, specifically directed toward the improvement of the jet fuel characteristics of sulfurous, kerosense boiling range fractions. The improvement is especially noticeable in the IPT Smoke Point, the concentration of aromatic hydrocarbons and the concentration of sulfur. This is normally considered a two-stage process wherein desulfurization is effected in the first reaction zone at relatively mild severities which result in a normally liquid product effluent containing from about 15 to about 35 p.p.m. of sulfur by weight. Aromatic saturation is the principal reaction effected in the second reaction zone, having disposed therein a catalytic composite of alumina, a halogen component, a rhenium component, a germanium component and a Group VIII noble metal component.

Suitable charge stocks are kerosene fractions which may have an initial boiling point as low as about 300° F., and an end boiling point as high as about 600° F. Exemplary of such kerosene fractions are those boiling from about 300° to about 550° F., from 330° to about 500° F., from 330° to about 530° F., from 350° to 550° F., etc. As a specific example, a kerosene obtained from hydrocracking about midcontent slurry oil, having a gravity of about 30.5° API, an initial boiling point of about 388° F., an end boiling point of about 522° F., indicates an IPT Smoke Point of 17.1 mm., and contains 530° p.p.m. of sulfur and 24.8 percent by volume of aromatic hydrocarbons. Through the use of the catalytic process of the present invention, the improvement in the jet fuel quality of such kerosene fraction is most significant with respect to raising the IPT Smoke Point, and reducing the concentration of sulfur and the quantity of aromatic hydrocarbons. Published specifications for the poorest quality of jet fuel, commonly referred to as Jet-A, Jet-Al and Jet-B, call for a sulfur concentration of about 0.3 percent by weight maximum (3,000 p.p.m.), a minimum IPT Smoke Point of 25 mm. and a maximum aromatic concentration of about 20.0 volume percent.

In practicing the present invention, the charge stock is admixed with recycled hydrogen in an amount within the range of from about 1,000 to about 2,000 s.c.f./bbl. This mixture is heated to a temperature level necessary to control the maximum catalyst bed temperature below about 725° F., and preferably not above 700° F., with a lower catalyst bed temperature of about 600° F. The catalyst, a standard hydrogenation composite, containing about 2.2 percent by weight of cobalt and about 5.7 percent by weight of molybdenum, composited with alumina, is disposed in a reaction zone maintained under an imposed pressure in the range of from about 500 to about 1,100 p.s.i.g. The LHSV is in the range of about 0.5 to about 10.0, and preferably from about 0.5 to about 5.0. The total reaction product effluent from this first catalytic reaction zone is separated to provide a hydrogen-rich gaseous phase and a normally liquid hydrocarbon stream containing from 15 p.p.m. to about 35 p.p.m. of sulfur by weight. The normally liquid phase portion of the first reaction zone effluent is utilized as a fresh feed charge stock to the second reaction zone. In this particular instance, the first reaction zone decreases the sulfur concentration to about 25 p.p.m., the aromatic concentration to about 16.3 percent by volume and has increased the IPT Smoke Point to a level of about 21.5 mm.

The catalytic composite within the second reaction zone comprises alumina, 0.25 percent by weight of rhenium, 0.50 percent by weight of germanium, about 0.70 percent by weight of combined chloride and 0.25 percent by weight of platinum, calculated on the basis of the elements. The reaction zone is maintained at a pressure of about 400 to about 1,500 p.s.i.g. and the hydrogen circulation rate is in the range of 1,500 to about 10,000 s.c.f./bbl. The LHSV is in the range of about 0.5 to about 5.0, and preferably from about 0.5 to about 3.0. It is preferred to limit the catalyst bed temperature in the second reaction zone to a maximum level of about 750° F. With a catalyst of these particular chemical and physical characteristics, optimum aromatic saturation, processing a feed stock containing from about 15 to about 35 p.p.m. of sulfur, is effected at maximum catalyst bed temperatures in the range of about 625° to about 750° F. With respect to the normally liquid kerosene fraction, recovered from the condensed liquid removed from the total product effluent, the sulfur concentration is effectively "nil," being less than 0.1 p.p.m. The quantity of aromatic hydrocarbons, has been decreased to a level of about 1.0 percent by volume, or less, and the IPT Smoke Point has been increased to above about 35.0 mm.

With respect to another kerosene fraction, having an IPT Smoke Point of about 20.7 mm., an aromatic concentration of about 19.5 vol. percent and a sulfur concentration of about 17 p.p.m. by weight, the same is processed in a catalystic reaction zone at a pressure of about 800 p.s.i.g. and a maximum catalyst bed temperature of about 700° F. The LHSV is about 1.25, and the hydrogen circulation rate is about 8,000 s.c.f./bbl. The catalytic composite disposed within the reaction zone comprises alumina, 0.01 percent by weight of rhenium, 0.2 percent by weight of germanium, about 0.80 percent by weight of combined chloride and 0.5 percent by weight of platinum. Following separation and to concentrate the kerosene fraction, analyses indicate that the Smoke Point has been increased to a level of about 37.0 mm., the aromatic concentration has been lowered to about 0.50 percent by volume and the sulfur concentration is essentially "nil," being less than 0.01 p.p.m. by weight.

EXAMPLE IV

This illustration of a hydrocarbon hydroprocessing scheme is one which involves hydrocracking heavy hydrocarbonaceous material into lower boiling hydrocarbon products. In this instance, the catalyst preferably contains a rhenium component, a germanium component, and a platinum or palladium component combined with a crystalline aluminosilicate carrier material, preferably faujasite, and still more preferably one which is at least 90.0 percent by weight zeolitic. In some instances, a halogen component may be combined with the carrier material, particularly fluorine and/or chlorine.

Most of the virgin stocks, intended for hydrocracking, are contaminated by sulfurous compounds and nitrogenous compounds, and, in the case of the heavier charge stocks, various metallic contaminants, insoluble asphalts, etc. Contaminated charge stocks are generally hydrotreated, or hydrorefined, in order to prepare a charge suitable for hydrocracking. Thus, the catalytic process of the present invention can be beneficially utilized as the second stage of a two-stage process, in the first stage of which the fresh feed is hydrorefined.

Hydrocracking reactions are generally effected at elevated pressures in the range of about 800 to about 5,000 p.s.i.g., and preferably at some intermediate level of 1,000 to about 3,500 p.s.i.g. Liquid hourly space velocities of about 0.25 to about 10.0 will be suitable, the lower range generally reserved for the heavier stocks. The hydrogen circulation rate will be at least about 3.000 s.c.f./bbl., with an upper limit of about 50,000 s.c.f./bbl., based upon fresh feed. For the majority of feed stocks, hydrogen concentrations in the range of 5,000 to 20,000 s.c.f./bbl. will suffice. With respect to the LHSV, it is generally based upon fresh feed, notwithstanding the use of liquid recycle providing a combined liquid feed ratio in the range of about 1.1 to about 6.0. The operating temperature again alludes to the maximum temperature of the catalyst within the reaction zone, and is in the range of about 400° to about 900° F. Since the principal reactions are exothermic in nature, the increasing temperature gradient, experienced as the charge stock traverses the catalyst bed, results in an outlet temperature higher than that at the inlet to the catalyst bed. The maximum catalyst temperature in a hydrocracking process should not exceed about 900° F., and a preferred technique is to limit the temperature increase to 100° F. or less.

Although amorphous composites of alumina and silica, containing from about 10.0 percent to about 90.0 percent by weight of the latter, are suitable for use in the catalytic composite employed in the hydroprocessing of hydrocarbons, a preferred carrier material constitutes a crystalline aluminosilicate, preferably faujasite, of which at least about 90.0 percent by weight is zeolitic. This carrier material, and a method of preparing the same, have hereinbefore been described. One possible constituent of the catalyst is a halogen component, either fluorine, chlorine, iodine, bromine, or mixtures thereof.

Of these, it is preferred to utilize a catalyst containing fluorine and/or chlorine. The halogen component will be composited with the carrier material in such a manner as results in a final composite containing about 0.1 to about 3.5 percent by weight of halogen, calculated on an elemental basis.

A specific illustration of this hydrocarbon hydroprocessing technique involves the use of a hydrocracking catalytic composite of about 0.25 percent by weight of rhenium, 0.9 percent by weight of combined chloride, 0.5 percent by weight of germanium and 0.25 percent by weight of palladium, combined with an amorphous alumina-silica carrier material consisting of 75.0 percent by weight of silica and 25.0 percent by weight of alumina. This catalyst is intended for utilization of the processing of a blend of vacuum gas oils (9,500 bbl./day) to produce maximum quantities of gasoline boiling range hydrocarbons (heptane to 340° F.) and about 12.0 to 18.0 percent by volume of a 340° F. kerosene fraction ultimately to be converted into a jet fuel fraction. The charge stock has a gravity of 29.0° API, an initial boiling point of about 550° F., a 50.0 percent volumetric distillation temperature at 750° F. and an end boiling point of 1,040° F. The charge stock contains 2,000 p.p.m. by weight of sulfur and 550 p.p.m. by weight of nitrogen, and is initially subjected to a cleanup operation at a maximum catalyst temperature of 775° F., which temperature represents an increasing temperature gradient of about 100° F. The pressure imposed upon the cleanup reaction zone is about 2,000 p.s.i.g., the hydrogen circulation rate is about 6,000 s.c.f./bbl., and the normally liquid charge stock contacts the catalyst at a LHSV of about 0.89.

This unit is designed to function in a semiseries flow fashion with fractionation facilities intermediate the two reaction zones. Following separation of the first zone effluent, in a high pressure separator, to provide a hydrogen-rich recycle gas stream, the normally liquid portion is introduced into the fractionation facilities along with the liquid product effluent from the second, hydrocracking zone. The two desired product streams, heptane–340° F. and 340° to 540° F. are recovered and the 540° F.-plus portion and excess 340°-540° F. kerosene is introduced into the hydrocracking zone. Hydrogen consumption in the cleanup reaction zone is 1.36 percent by weight of fresh feed, or 796 s.c.f./bbl.

The pressure imposed upon the hydrocracking reaction zone is 2,000 p.s.i.g. and the maximum catalyst bed temperature is 625° F., representing an increase of 50° F. controlled by hydrogen quench in an amount of 2,400 s.c.f./bbl. The LHSU, based upon fresh feed only, is 0.69 and the hydrogen circulation rate is 9,100 s.c.f./bbl. The hydrogen consumption is 1.29 percent by weight, on the basis of 9,500 bbl./day of fresh feed, or 752 s.c.f./bbl. In the following table, there is indicated the product yield and distribution of this illustrative process, inclusive of the hydrogen consumed in the process.

TABLE II

Hydrocracking Product Distribution*

| Component | Stage I | Stage II | Total |
|---|---|---|---|
| Ammonia | 0.07 | | 0.07 |
| Hydrogen Sulfide | 2.13 | | 2.13 |
| Methane | 0.13 | | 0.13 |
| Ethane | 0.22 | 0.08 | 0.30 |
| Propane | 0.45 | 2.40 | 2.85 |
| iso-Butane | 0.46 | 12.57 | 13.03 |
| n-Butane | 1.03 | 5.19 | 6.22 |
| iso-Pentane | 0.56 | 14.77 | 15.33 |
| n-Pentane | 0.55 | 1.62 | 2.17 |
| Hexanes | 1.24 | 14.06 | 15.30 |
| Heptane–340° F. | 5.50 | 49.83 | 55.33 |
| 340°–540° F. | 15.00 | | 15.00 |
| Excess 340°–540° F. | 14.26 | | |
| 540° F.-plus | 68.88 | | |

*Values for propane and lighter components are given in weight percent; those of isobutane and heavier components in volume percent.

With respect to the butane product and the pentane product, the former is indicated as being about 68.0 percent iso-butanes, while the latter constitutes about 87.8 percent iso-pentanes. As analysis of the combined pentane/hexane fraction indicates a gravity of 83.6° API, a clear research octane rating of 84.3 and a leaded research octane rating of about 98.4; as such, this fraction constitutes an excellent blending component for motor fuel. The heptane–340° F. gasoline boiling fraction has a gravity of 59.1° API, and contains 64.4 percent by volume of paraffins, 29.7 percent by volume of naphthenes and 5.9 percent by volume of aromatics, and can be utilized as the charge stock to a catalytic reforming unit to improve the motor fuel characteristics thereof.

EXAMPLE V

A crystalline aluminosilicate catalyst, the method of preparation of which was previously set forth, about 92.3 percent by weight of which is faujasitic, is impregnated with chloroplatinic acid, perrhenic acid, a chlorine solution of germanium oxide and hydrochloric acid. The composition of the impregnating solution is such that the final catalyst contains 0.75 percent by weight of platinum, 0.50 percent by weight of germanium, 0.50 percent by weight of rhenium and 0.75 percent by weight of combined chloride. The catalyst is disposed in a hydrocracking reaction zone which is in series-flow integration with a cleanup reaction zone. The cleanup zone contains a typical hydrorefining catalyst of 2.0 percent by weight of nickel and 16.0 percent by weight of molybdenum combined with a carrier material consisting of 63.0 percent by weight of silica and 37.0 percent by weight of alumina.

The intended object of this combination process is the conversion of a heavy gas oil into maximum quantities of a heptane–400° F. end point naphtha product, accompanied by minimum production of light gaseous hydrocarbons. The charge stock has a gravity of 17.5° API, an initial boiling point of 650° F., a 50.0 percent volumetric distillation temperature of 830° F. and an end boiling point of about 1.020° F. Contaminants in the charge stock include 1.10 percent by weight of sulfur and about 1,800 p.p.m. of nitrogen.

HYdrogen, in an amount of 10,000 s.c.f./bbl. is admixed with the charge stock (charge stock rate is 17,260 bbl./day and the mixture is introduced into the cleanup zone under a pressure of about 2,300 p.s.i.g. The maximum catalyst bed temperature is 850° F., representing an increasing gradient of 100° F., and the LHSV is 0.71. The product effluent is passed into the hydrocracking zone following its use as a heat-exchange medium to lower its temperature to the extent necessary to provide a catalyst inlet temperature of 780° F. The hydrocracking zone is maintained under a pressure of about 2,250 p.s.i.g., and the LHSV is 0.59 based on fresh feed only; the charge is admixed with 10,356 bbl./day of a 400° F.-plus liquid recycle to provide a combined liquid feed ratio of 1.6. The increasing temperature gradient is 20° F., being controlled through the use of hydrogen quench in an amount of 1,700 s.c.f./bbl. Hydrogen consumption is 3.80 percent by weight overall, with 1.60 percent consumed in the hydrocracking zone. Thus, total hydrogen consumption is 2,389 s.c.f./bbl.

Product yield and component distribution are presented in the following table III.

TABLE III

Hydrocracking Product Yield and Distribution

| Component | Wt.% | Vol.% |
| --- | --- | --- |
| Ammonia | 0.22 | |
| Hydrogen Sulfide | 1.17 | |
| Methane | 0.35 | |
| Ethane | 0.48 | |
| Propane | 3.28 | |
| iso-Butane | 9.36 | 15.79 |
| n-Butane | 4.16 | 6.76 |
| iso-Pentane | 8.95 | 13.61 |
| n-Pentane | 0.68 | 1.02 |
| Hexanes | 14.44 | 19.75 |
| Heptane-400° F. | 60.72 | 74.09 |

The total liquid volumetric yield, including the iso- and n-butanes, is 131.01 percent. It will be noted from table III that the butane stream consists of about 69.8 percent iso-butane, while the pentane stream consists of about 93.2 percent iso-pentanes. The desired naphtha fraction has a gravity of 50.3° API, a clear octane rating of 66.8 (84.5 with 3.0 cc. TEL), and consists of 24.6 percent paraffins, 59.0 percent naphthenes and 16.4 aromatics. As will be recognized by those possessing expertise in petroleum technology, this fraction constitutes an excellent charge to a catalytic reforming unit. The combined pentane/hexane fraction has a gravity of 81.3° API, a clear octane rating of 84.1 and a leaded octane rating of 98.2; it is, therefore, a valuable motor fuel blending component.

The foregoing specification, especially the examples thereof, illustrates, the process of the present invention and the benefits afforded through the utilization thereof.

I claim as my invention:

1. A process for hydrocracking a hydrocarbonaceous charge stock into lower molecular weight hydrocarbons which comprises reacting said charge stock with hydrogen, at a temperature of about 400° to 900° F., and a pressure of about 800 to 5,000 p.s.i.g., in contact with a catalytic composite containing from 0.01 percent to about 2.0 percent by weight of a rhenium component, from 0.01 percent to about 5.0 percent by weight of a germanium component, from 0.01 percent to about 2.0 percent by weight of a Group VIII noble metal component, and a porous carrier material, the aforesaid percentage being calculated on an elemental basis.

2. The process of claim 1 further characterized in that said catalytic composite is reduced and sulfided prior to contact with said charge stock.

3. The process of claim 1 further characterized in that said Group VIII noble metal is platinum or palladium.

4. The process of claim 1 further characterized in that said catalytic composite also contains from about 0.1 percent to about 3.5 percent by weight of a halogen component, on an elemental basis.

5. The process of claim 1 further characterized in that said carrier material is an amorphous refractory inorganic oxide.

6. The process of claim 1 further characterized in that said carrier material is a crystalline aluminosilicate.

7. The process of claim 1 further characterized in that said carrier material comprises faujasite.

8. A catalyst comprising a substantially pure crystalline aluminosilicate carrier material, at least about 90.0 percent by weight of which is zeolitic, from 0.01 percent to about 2.0 percent by weight of a rhenium component, from 0.01 percent to about 5.0 percent by weight of a germanium component, and from 0.01 percent to about 2.0 percent by weight of a Group VIII noble metal component, the aforesaid percentages being calculated on an elemental basis.

9. The catalyst of claim 8 further characterized in that said Group VIII noble metal is platinum.

10. The catalyst of claim 8 further characterized in that said Group VIII noble metal is palladium.

11. The catalyst of claim 8 further characterized in that said crystalline aluminosilicate is faujasite.